(12) United States Patent
Morita

(10) Patent No.: US 7,275,876 B2
(45) Date of Patent: Oct. 2, 2007

(54) OPTICAL TRANSMISSION CIRCUIT DEVICE

(75) Inventor: Yoshihiro Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 241 days.

(21) Appl. No.: 10/994,292

(22) Filed: Nov. 23, 2004

(65) Prior Publication Data

US 2006/0045417 A1    Mar. 2, 2006

(30) Foreign Application Priority Data

Aug. 27, 2004    (JP) .............................. 2004-248906

(51) Int. Cl.
*G02B 6/03*    (2006.01)
*G02B 6/12*    (2006.01)
(52) U.S. Cl. .......................................... 385/89; 385/14
(58) Field of Classification Search ................. 385/89, 385/14
See application file for complete search history.

(56) References Cited

U.S. PATENT DOCUMENTS

| | | | | |
|---|---|---|---|---|
| 4,751,613 A | * | 6/1988 | Werdin et al. .............. | 361/799 |
| 5,412,497 A | * | 5/1995 | Kaetsu et al. .............. | 398/164 |
| 5,920,664 A | * | 7/1999 | Hirabayashi et al. ......... | 385/16 |
| 6,305,848 B1 | * | 10/2001 | Gregory ...................... | 385/53 |
| 2001/0030855 A1 | * | 10/2001 | Green et al. ................. | 361/754 |
| 2003/0020986 A1 | * | 1/2003 | Pang et al. .................. | 359/152 |
| 2003/0053786 A1 | * | 3/2003 | Kato et al. .................. | 385/134 |
| 2004/0069997 A1 | * | 4/2004 | Dair et al. ................... | 257/81 |
| 2006/0045417 A1 | * | 3/2006 | Morita ........................ | 385/31 |
| 2006/0211294 A1 | * | 9/2006 | Lipski et al. ................ | 439/488 |

FOREIGN PATENT DOCUMENTS

JP       2001-102765      4/2001

* cited by examiner

*Primary Examiner*—K. Cyrus Kianni
(74) *Attorney, Agent, or Firm*—Staas & Halsey LLP

(57) ABSTRACT

A plurality of boards are arranged perpendicular to a base plate and parallel to each other. An optical transmission circuit connects the boards according to an optical transmission method. Each of the boards has a photoelectric conversion circuit that converts optical signals into electric signals and vice versa. The optical transmission circuit includes a plurality of optical transmission paths parallel to each other and extending in a direction of arrangement of the boards on the base plate, and an optical connection part mounted on said base plate for each of the boards and connected to the optical transmission paths. The photoelectric conversion circuit is connected to an optical connection part so that data transmission between the boards is performed through the optical transmission circuit.

9 Claims, 13 Drawing Sheets

OPTICAL TRANSMISSION CIRCUIT DEVICE

BACKGROUND OF THE INVENTION

1. Field of the Invention

The present invention generally relates to optical transmission circuit devices and, more particularly, to an optical transmission circuit device having a board on which electronic devices are mounted to as to perform data transmission between boards.

2. Description of the Related Art

In recent years, the Internet has become popular rapidly which enables almost all the information services and transactions being achieved on the Internet. Accordingly, the importance of the Internet as a civil infrastructure has been increasing. With such development in the Internet, there is a demand for improvements in an operation speed, expandability and operating rate in a server system that supports the Internet.

A blade server such as shown in FIG. 1 has a cabinet 101 in which a plurality of unit devices 102 are stored in a stacked state. Each unit device 102 shown in FIG. 2 is provided with many boards 103. Each board 103 is provided with a CPU (Central Processing Unit), a memory circuit, a hard disk apparatus, etc. Each board 103 constitutes one independent system. Such a blade server is capable of dealing with an increase in the number of transactions by increasing the number of boards 103 and increasing the number of the unit devices 102. Additionally, the blade server has an advantageous function to replace the malfunctioning board 103 while operating the blade server.

In the conventional unit device, data transmission between boards is performed through electric cables connected by dizzy chain on a backside of a back plane to which the boards are connected. However, in a high-speed electric signal transmission such as, for example, an electric signal transmission in a GHz order, a signal waveform is blunted and a signal voltage is suppressed, which results in weakness in noise, and it becomes difficult to perform a high-quality signal transmission. In order to solve such a problem, Japanese Laid-Open Patent Application No. 2001-102765 suggests an optical transmission method using optical fibers.

By the way, it is possible to set the transmission rate per one channel to a GHz order in the optical transmission method. However, when connection is made by optical fibers 104 on the side of the back plane 108 of the unit device 102 shown in FIG. 2, it is difficult to connect by many optical fibers 104 since it is difficult to increase a density of connection parts 105 such as connectors provided on the back plane 108. Therefore, it is difficult to connect the boards according to parallel transmission. Further, since it is difficult to bend the optical fiber 104 to have a small radius of curvature, there is a problem in that there is less freedom in design of the connection parts 105.

Moreover, there may be a problem in that an operation error and thermal destruction may occur due to heat generated by a CPU and memory circuits that are mounted to the boards 103 with high density. For this reason, cooling fans 106 are provided on the backside of the back plane to which the boards are fixed and a front side of the boards 103 so that a cooling air caused by the cooling fans flows from a front side of the unit device 102 to the backside so as to cool the CPU and memory circuits. In such a unit apparatus 102, since the cooling air hardly flows upper and lower portions and side portions of the apparatus, a ventilation holes are 109 are provided on the back plane 108 to which the boards 103 are connected as shown in FIG. 2 so as to acquire passages of the cooing air. Accordingly, an area of the back plane 108 used for signal transmission is limited, and it is difficult to reserve an area of the connection parts 105 for connecting the boards 103 by many optical fibers.

SUMMARY OF THE INVENTION

It is a general object of the present invention to provide an improved and useful optical transmission circuit device in which the above-mentioned problems are eliminated.

A more specific object of the present invention is to provide an optical transmission circuit device, which is capable of performing high-speed signal transmission between boards.

In order to achieve the above-mentioned objects, there is provided according to one aspect of the present invention an optical transmission circuit device comprising: a base plate; a plurality of boards arranged perpendicular to the base plate and parallel to each other; and an optical transmission circuit connecting the boards according to an optical transmission method, wherein each of the boards has a photoelectric conversion circuit that converts optical signals into electric signals and vice versa; the optical transmission circuit includes a plurality of optical transmission paths parallel to each other and extending in a direction of arrangement of the boards on the base plate, and an optical connection part mounted on the base plate for each of the boards and connected to the optical transmission paths; and the photoelectric conversion circuit is connected to an optical connection part so that data transmission between the boards is performed through the optical transmission circuit.

According to the present invention, the optical transmission circuit connecting the boards is provided on the base plate such as a bottom plate on which the plurality of boards are mounted. Since the optical transmission circuit is connected to the boards through a plurality of optical transmission paths arranged parallel to each other and optical connection parts, transmission and reception of data can be performed according to a parallel transmission method, which results in a high-speed data transmission.

In the optical transmission circuit device according to the present invention, each of the optical transmission paths may comprise one of an optical fiber and an optical waveguide path.

The optical transmission circuit device according to the present invention may further comprise a plate arranged perpendicular to the base plate and the boards, wherein edges of the boards are fitted to rails provided on the base plate, and connection members provided to the boards are engaged with connection members provided to the plate so that the boards are fixed to the base plate and each of the photoelectric conversion circuits is aligned with a corresponding one of the optical connection parts. In the optical transmission circuit device, each of the optical transmission paths may comprise one of an optical fiber and an optical waveguide path.

In the optical transmission circuit device according to the present invention, each of the optical connection parts may include a plurality of optical fibers or a plurality of optical waveguide paths that are arranged regularly, and each of the optical connection parts may be connected to a respective one of the photoelectric conversion circuits by being brought into contact with the one of the photoelectric conversion circuits.

In the optical transmission circuit device according to the present invention, each of the photoelectric conversion circuits may include an optical-to-electric conversion element that converts optical signals into electric signals and an electric-to-optical conversion element that converts electric signals into optical signals.

In the optical transmission circuit device according to the present invention, the base plate may be arranged substantially horizontally and the boards may be arranged substantially vertically; other optical transmission circuit devices may be located above and under the optical transmission circuit device; each of the boards may have a first light-emitting/receiving circuit connected to a respective one of the photoelectric conversion circuits; the optical transmission circuit further may include an optical branch part that changes a direction of transmission of optical signals transmitting through the optical transmission paths to a direction substantially perpendicular to the base plate, a second light-emitting/receiving circuit provided on a bottom surface of the base plate and a plurality of vertical optical transmission paths connecting the second light-emitting/receiving circuit to the optical branch part; the first light-emitting/receiving circuit may include a first electric-to-optical conversion element and a first optical-to-electric conversion element, the first electric-to-optical conversion element sending optical signals to a light-emitting/receiving circuit of another optical transmission circuit device positioned above the optical transmission circuit device, the second electric-to-optical conversion element receiving optical signals from the light-emitting/receiving circuit of the another optical transmission circuit device; and the second light-emitting/receiving circuit includes a second electric-to-optical conversion element and a second optical-to-electric conversion element, the second electric-to-optical conversion element sending optical signals to a light-emitting/receiving circuit of another optical transmission circuit device positioned under the optical transmission circuit device, the second optical-to-electric conversion element receiving optical signals from the light-emitting/receiving circuit of the another optical transmission circuit device. The optical conversion circuit may be connected to the first light-emitting/receiving circuit in each of the boards. Each of the boards may include another optical connection part being brought into contact with and connected to the optical connection part and a plurality of other optical transmission paths connecting the another optical connection part and the first light-emitting/receiving circuit; and the first light-emitting/receiving circuit includes another first optical-to-electric conversion element and another fist electric-to-optical conversion element, the another first optical-to electric conversion element being connected to the first electric-to-optical conversion element and converting optical signals transmitting through the another optical transmission paths into electric signals, the another first electric-to-optical conversion element converting electric signals supplied from the first optical-to-electric conversion element into optical signals transmitted through the another optical transmission paths.

Additionally, there is provided according to another aspect of the present invention an optical transmission circuit device comprising: a base plate; a plurality of boards arranged perpendicular to the base plate and parallel to each other; and an optical transmission circuit connecting the boards according to an optical transmission method, wherein the base plate includes a first area and a second area separated from each other; each of the boards is arranged in the first area and includes a photoelectric conversion circuit that converts optical signals into electric signals and vice versa; and the optical transmission circuit includes: an optical connection part provided in the first area; a plurality of first optical transmission paths connected to the optical connection part and extending from the optical connection part to the second area; a first optical branch part changing a direction of optical signals of the optical connection part and the first optical transmission paths; a plurality of second optical transmission paths provided in the second area and formed in a direction of arrangement of the boards; and a second optical branch part mutually changing directions of transmission of optical signals of the first optical transmission paths and the second optical transmission paths, wherein the photoelectric conversion circuit and the optical connection part are connected to each other so as to perform data transmission between the boards.

According to the above-mentioned invention, an optical communication is performed between the first light-emitting/receiving circuits and the second light-emitting/receiving circuits provided on a bottom part of another optical transmission circuit device located above so as to achieve communication between the optical transmission circuit devices. Since the first light-emitting/receiving circuits are connected to the optical transmission circuits through the photoelectric conversion circuits, a high-speed signal transmission can be achieved according to a parallel transmission method between the vertically arranged optical transmission circuit devices.

The above-mentioned optical transmission circuit device may further comprise: a plate separating the first area and the second area from each other, the plate extending perpendicular to the base plate and in a direction of width of the optical transmission circuit device; and a light-emitting/receiving circuit provided to the plate on a side of the second area and connected to the first optical transmission paths so as to supply optical signals to other optical transmission circuit devices located above and/or under the optical transmission circuit devices and receive optical signals from the other optical transmission devices.

According to the above-mentioned invention, optical signals from the plurality of boards arranged in the first area are transmitted, in the second area separated from the first area, through the plurality of second optical transmission-paths and the second optical branch parts via the optical connection parts and the plurality of first optical transmission paths. Thus, a large space can be acquired for providing the second optical transmission paths and the second optical branch parts. Further, a space for providing optical amplifiers for amplifying the optical signals, isolators, etc., can be acquired.

Additionally, there is provided according to another aspect of the present invention a cabinet of an electronic apparatus comprising: a housing; and a plurality of optical transmission circuit devices having a structure mentioned.

Other objects, features and advantages of the present invention will become more apparent from the following detailed description when read in conjunction with the accompanying drawings.

DETAILED DESCRIPTION OF THE PREFERRED EMBODIMENTS

A description will be given, with reference to the drawings, of embodiments of the present invention.

First Embodiment

Figure 1:
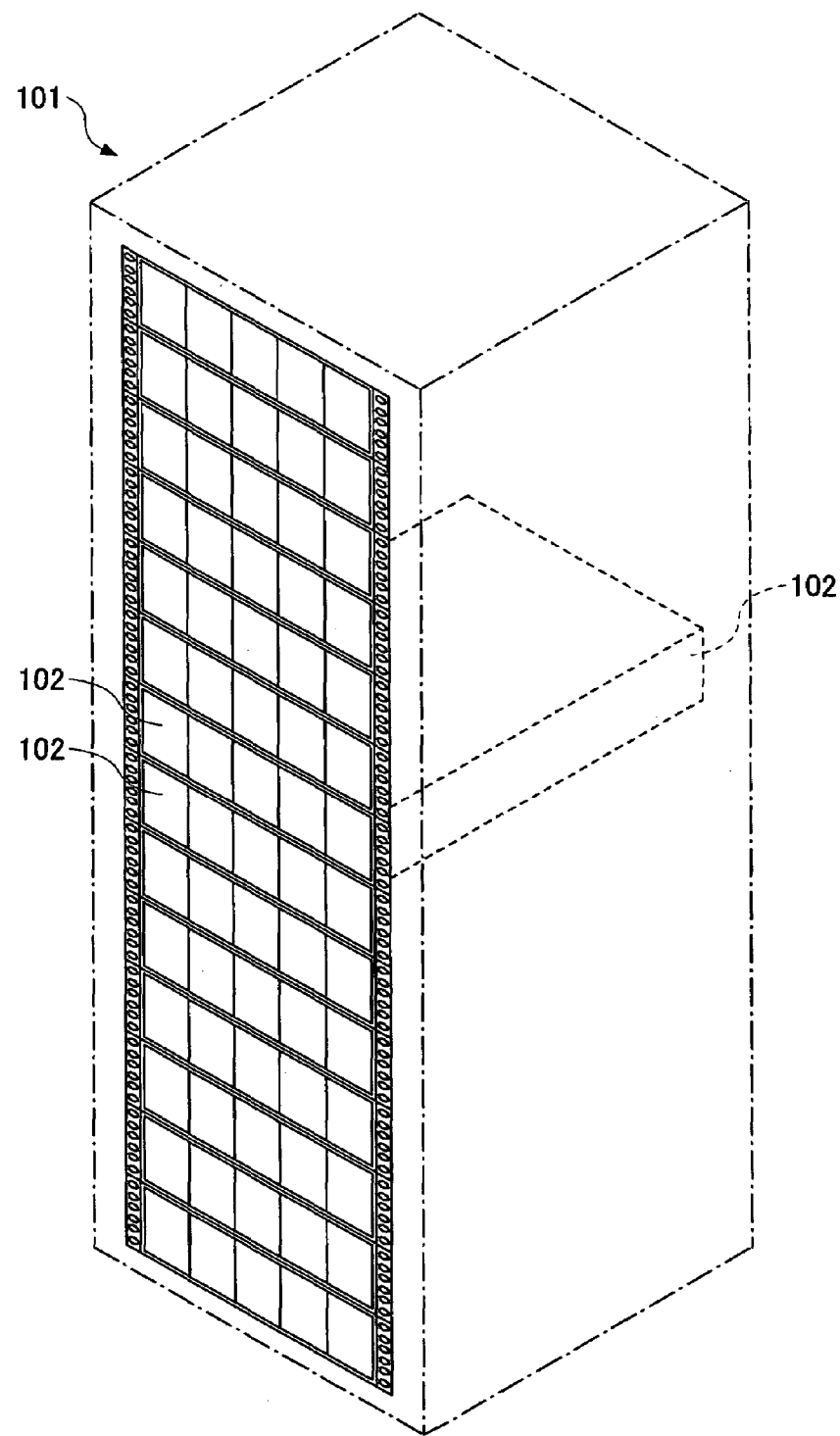
FIG. 1 is a perspective view of a cabinet of an electronic apparatus.
Figure 2:
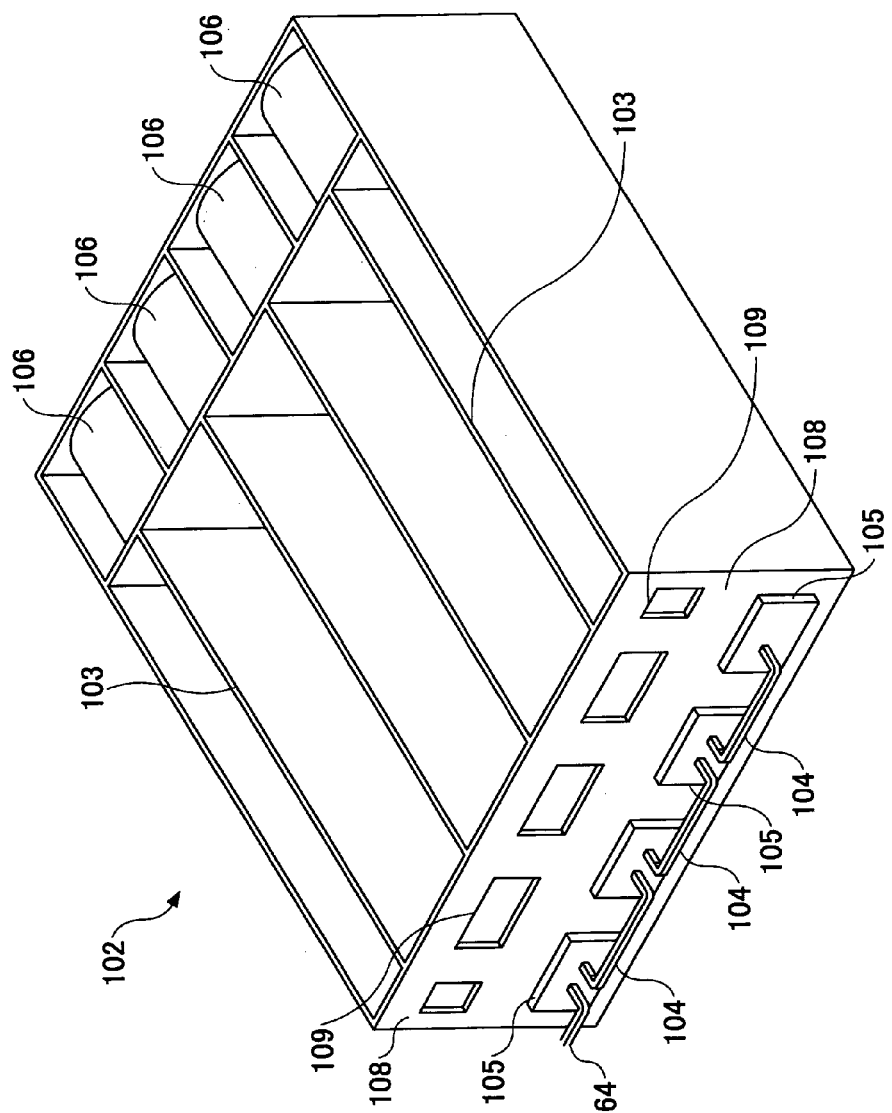
FIG. 2 is a perspective view of a conventional unit device.
Figure 3:
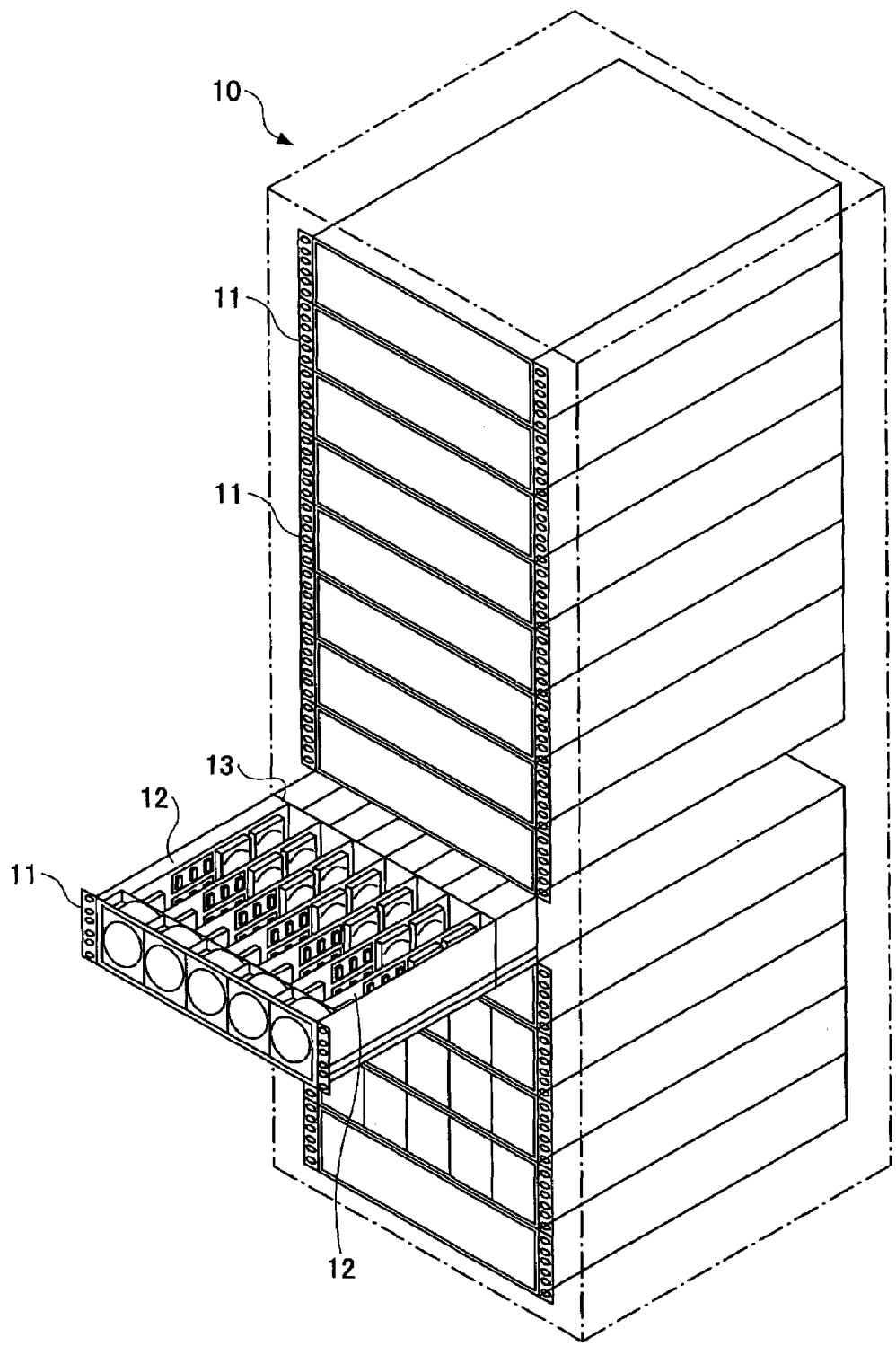
FIG. 3 is a perspective view of a cabinet of an electronic apparatus equipped with optical transmission circuit devices according to a first embodiment of the present invention.
Figure 4:
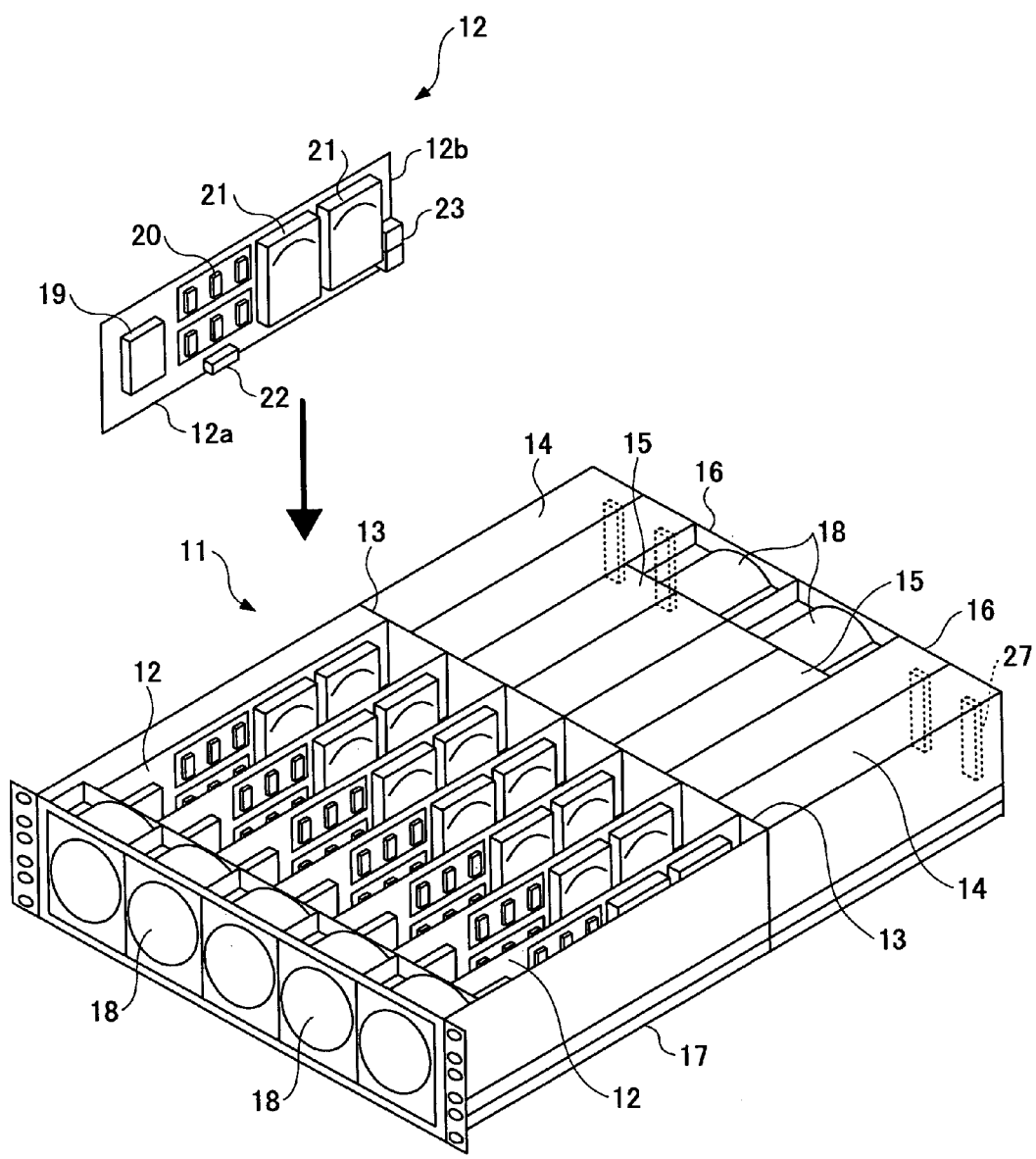
FIG. 4 is a perspective view of the optical transmission circuit device shown in FIG. 3.

FIG. 3 is a perspective view of a cabinet of an electronic apparatus equipped with optical transmission circuit devices according to a first embodiment of the present invention. FIG. 3 shows a state where one of the optical transmission circuit devices is drawn from a cabinet of an electronic apparatus. FIG. 4 is a perspective view of the optical transmission circuit device.

Referring to FIG. 3 and FIG. 4, the optical transmission circuit devices 11 are accommodated in a housing of the cabinet 10 of an electronic apparatus in a multi-stage state where the optical transmission circuit devices 11 are arranged vertically. Each optical transmission circuit device 11 is provided with a plurality of boards 12, a plurality of input/output units 14 that are separated from the boards 12, respectively, by a center plane 13 and a power supply unit 15, which are situated on a bottom plate (base plate) 17. Additionally, cooling fans 18 are provided at the front face of the optical transmission circuit device 11 and between the center plane 13 and a back plane 16 so that outside air is taken as a cooling air from the front face of the optical transmission circuit device 11 and the cooling air passes through spaces between the boards 12, passes through openings (no appear in the figure) of the center plane 13, and flows out of the apparatus through openings (not appear in the figure) provided in the back plane 16.

Each board 12 is provided with a central processing unit (CPU) 19, memory circuit units 20, hard disk apparatuses 21, a photoelectric conversion circuit unit 22, wirings (not shown) constituting a bus for transmitting data between those units and a bus driver. The boards 12 are arranged substantially perpendicular to the bottom plate 17 of the optical transmission circuit device 11 and parallel to each other. A lower edge 12a of each board 12 is fitted into a rail 25 shown in FIG. 5 on the bottom plate 17. A connector 23 provided at a rear end portion 12b of each board 12 is fitted to a connector 24 shown in FIG. 5 provided on the center plane 13. Each board 12 is inserted into the corresponding rail 25 from above the optical transmission circuit device 11, and, subsequently the connector 23 is pushed into the connector 24 of the center plane 13. A control signal is supplied from the input/output unit 14 provided on the side of the back plane 16 through a cable (not shown in the figure), and is transmitted to other optical transmission circuit devices 11 from a control signal connector 27 provided to the back plane 16 through a cable. An electric power is supplied from a power supply unit 15 or directly from an external apparatus.

Figure 5A:
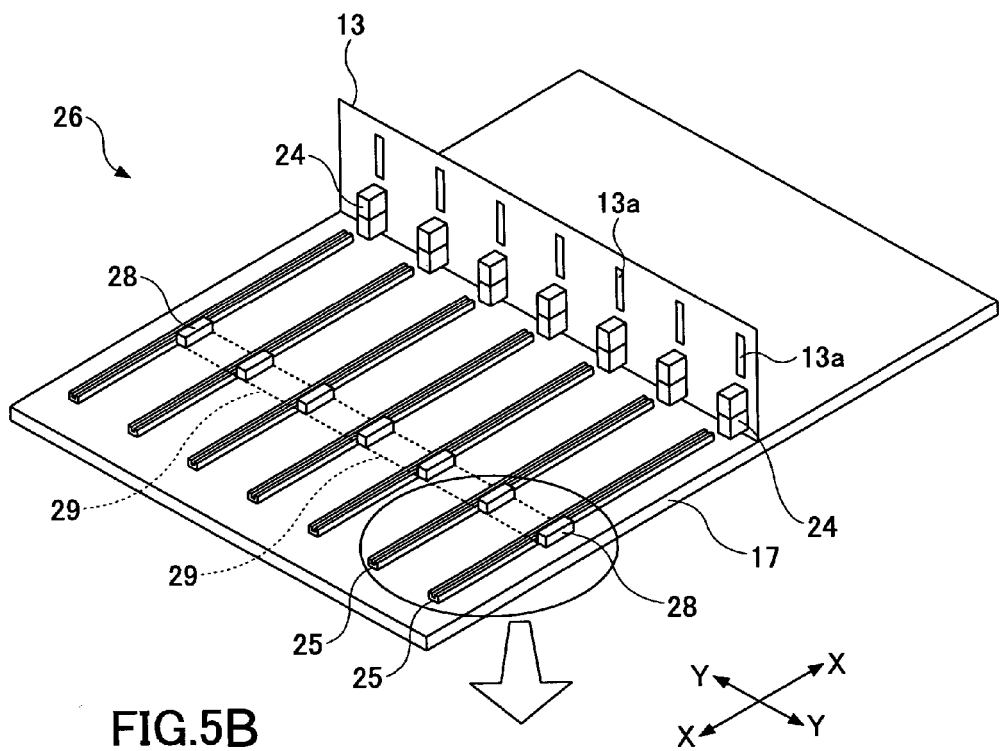
FIG. 5A is a perspective view of a bottom plate and a center plane of the optical transmission circuit device.
Figure 5B:
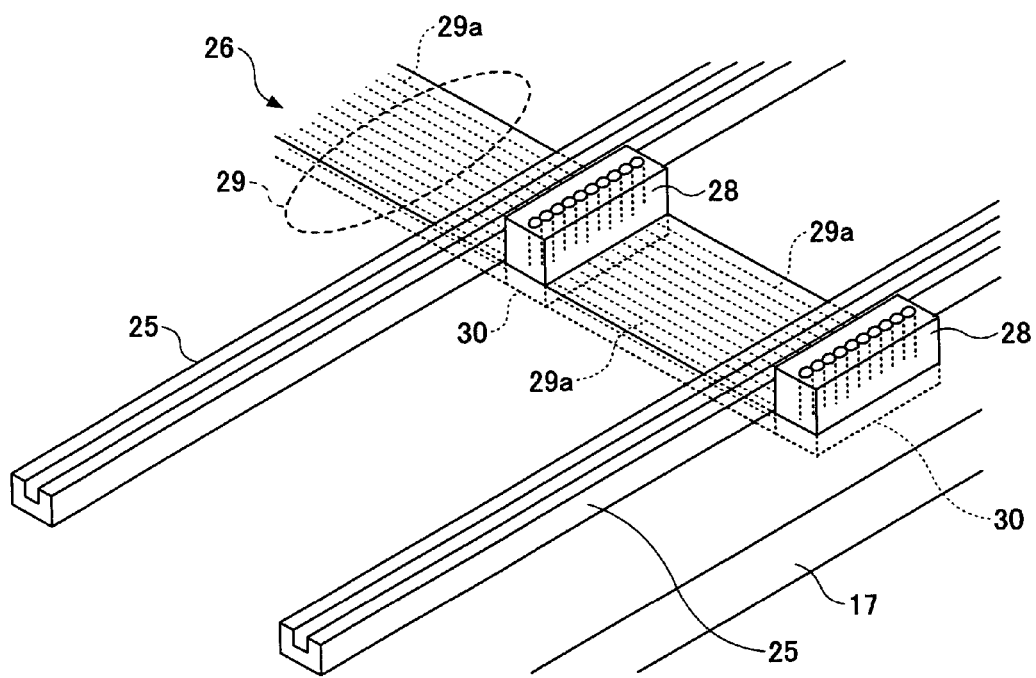
FIG. 5B is an enlarged view of a part A shown in FIG. 5A.

FIG. 5A is a perspective view of the bottom plate and the center plane of the optical transmission circuit device. FIG. 5B is an enlarged view of a part A shown in FIG. 5A. It should be noted that side plates and the back plane are omitted in FIGS. 5A and 5B.

With reference to FIG. 5, the center plane 13 of the optical transmission circuit device 11 is provided with the control signal connectors 24 that are connected to the boards 12 and ventilation openings 13a for a cooling air.

The rails 25, each of which has an opening parts into which the board 12 is fitted, are arranged to extend in a direction (direction X in the figure) from the front side to the back side, and are arranged parallel to each other in a direction of width (direction Y in the figure) of the bottom plate 17. The bottom plate 17 is provided with an optical transmission circuit 26, and optical connection parts 28 of the optical transmission circuit 26 are provided to a surface of the bottom plate 17.

The optical transmission circuit 26 is embedded in the bottom plate 17 so that an optical fiber bundle 29, which contains a plurality of optical fibers 29a in parallel, extends in a direction perpendicular to the longitudinal direction of the rails 25. The bottom plate 17 has an area larger than the center plane 13, which is provided with connectors 24 and the ventilation openings 13a. Thus, many optical fibers 29a can be provided by providing the optical transmission circuit 26 to the bottom plate 17. Furthermore, the optical transmission circuit 26 is provided with optical connection parts 28 and optical branch parts 30. The optical connection parts are located near the respective rails 25. The optical branch parts 30 connect the optical fiber bundle 29 to the optical connection parts 28.

A description will be given below, of the optical transmission circuit 26 and the boards 12 in detail.

Figure 6:
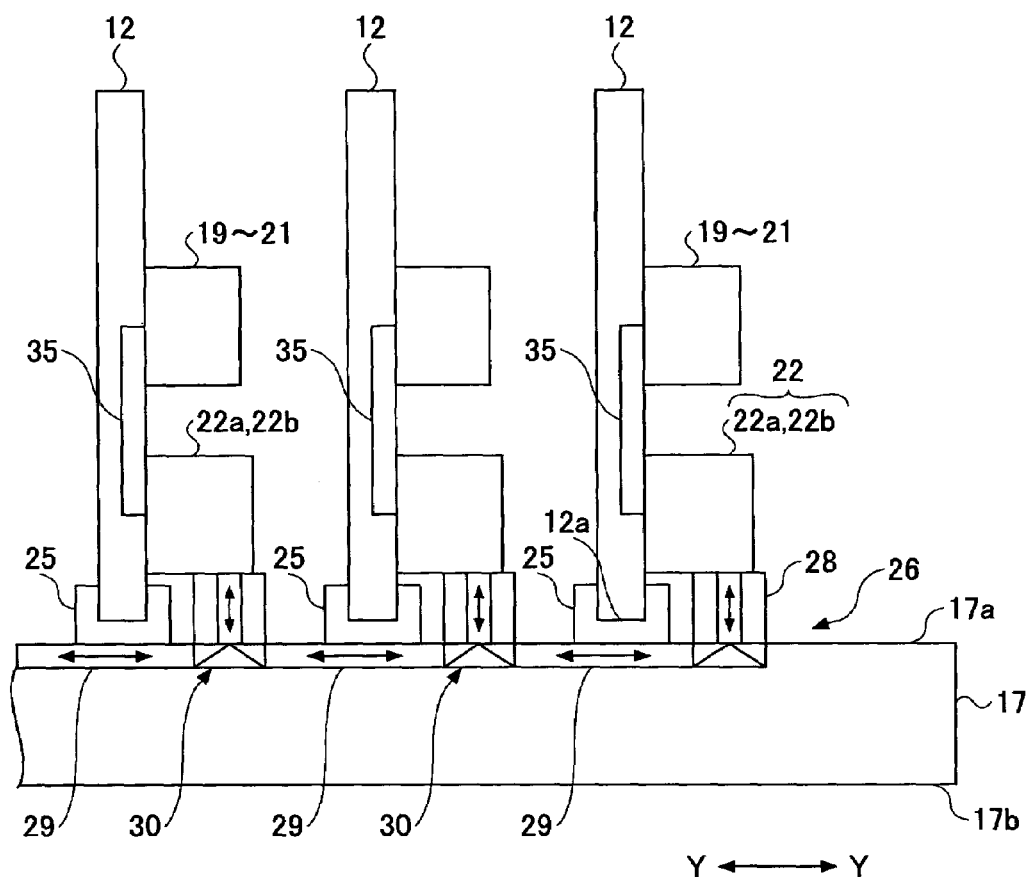
FIG. 6 is an illustration of a part of the optical transmission circuit device.
Figure 7:
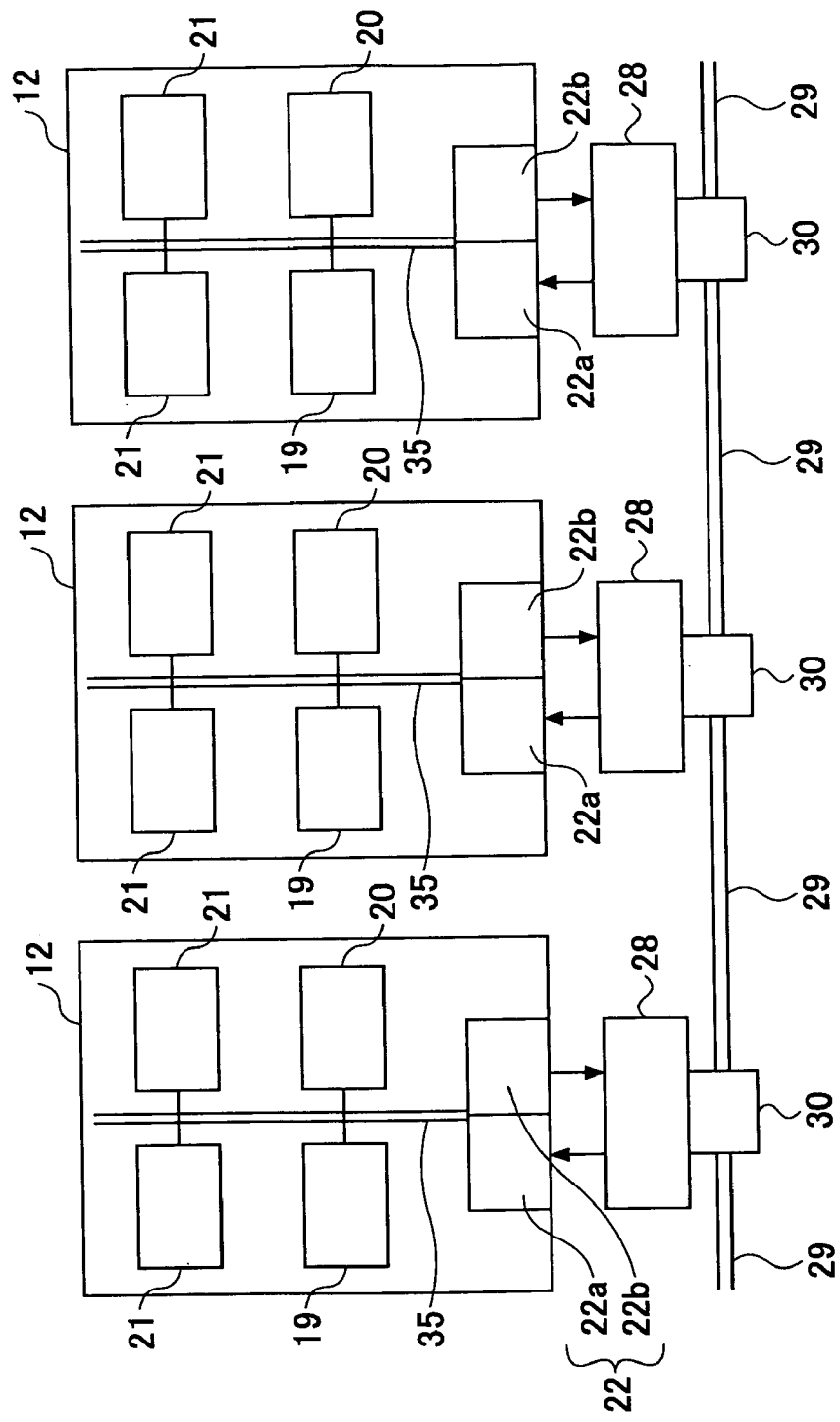
FIG. 7 is a block diagram of an optical transmission circuit.

FIG. 6 is an illustration of a part of the optical transmission circuit apparatus. FIG. 7 is a block diagram of the optical transmission circuit.

Referring to FIG. 6 and FIG. 7, the optical transmission circuit 26 comprises the optical fiber bundle 29, the optical branch parts 30 and the optical connection parts 28. Each of the optical branch parts 30 changes a direction of propagation of optical signals transmitted through the optical fibers 29a. Each of the optical connection parts 28 is connected to the photoelectric conversion circuit 22 of the respective one of the boards 12. The optical transmission circuit 26 causes optical signals to propagate in the direction (direction Y in the figure) of width of the bottom plate 17 by a repeated structure of the optical fiber bundle 29 and the optical branch parts 30. A part of the optical signals is directed upward by the optical branch parts 30 and is transmitted to the optical connection parts 28.

The optical fiber bundle 29 comprises, for example, 10 single core optical fibers 29a that are arranged in parallel so as to form a tape-like material, and is embedded in the bottom plate 17. The optical fiber bundle 29 is connected with the optical branch parts 30 at opposite ends thereof.

Each optical fiber 29a has, for example, a multi-mode core having a diameter of 50 micron.

Figure 8:
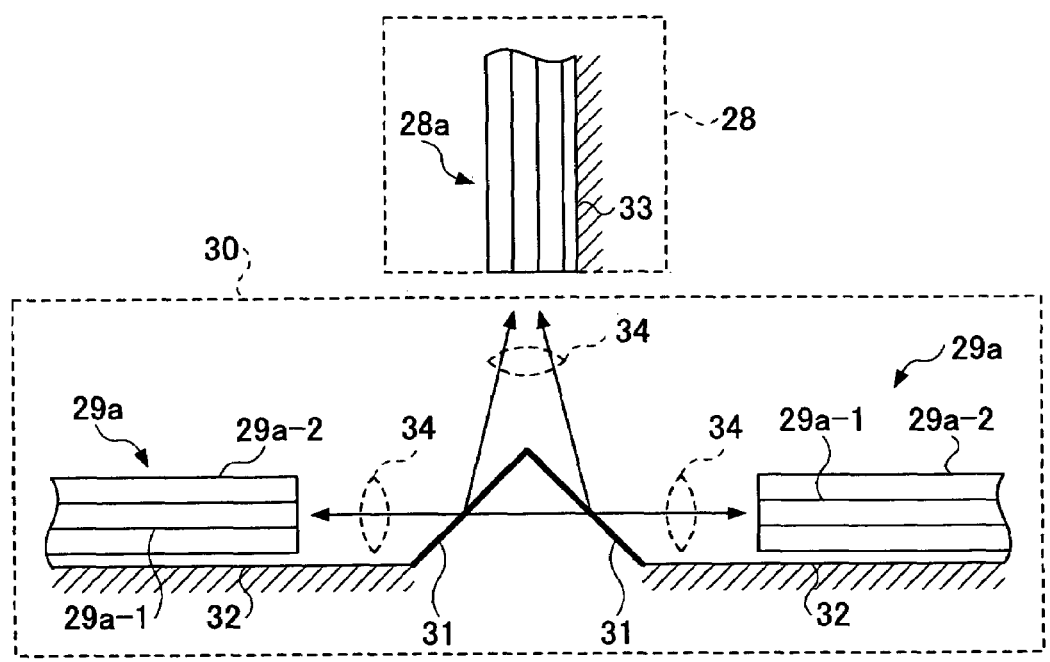
FIG. 8 is an illustration of an optical branch part.

FIG. 8 is an illustration of the optical branch part. Referring to FIG. 8 together with FIG. 6 and FIG. 7, each optical connection part 30 comprises half mirrors 31 and V-shaped groove members 32 on both sides of the half mirrors 31. The V-shaped groove members 32 are provided for fixing the optical fibers 29a. The V-shaped groove member 32 is provided to each optical fiber 29a, and the half mirror 31 is provided to each optical fiber bundle 29. A part of a light propagating in the optical fiber 29a is reflected by the half mirror 31 toward the optical connection part 29 located above the half mirror 31, and also a part of the light propagating in the optical fiber transmits the half mirror 31 and travels straight and incident on the adjacent optical fiber 29a. The optical branch part 30 positions the core 29a-1 by the v-shaped groove of the V-shaped groove member 32 by restricting the outer periphery of a clad layer 29a-2 that surrounds the core 29a-1 of the optical fiber 29a. Thus, the optical connection part 28 and the optical fibers 29a are aligned, which reduces a loss of the optical signals. It should be noted that a micro lens 34 may be arranged between an end surface of the optical fiber 29a and the half mirror 31 so as to reduce an optical loss by condensing the optical signals.

The half mirror 31 reflects a part of optical signals projected from the end surface of the optical fiber 29a and transmits the rest of the optical signals therethrough. The intensity ratio of a reflected light to a transmitted light is preferably set in a range of 1:1 to 1:several tens. It should be noted that the optical branch part 30 may use a right-angle type prism instead of the half mirror 31.

It should be noted that a part of the optical fiber bundle 29 other than a part fixed by the V-shaped groove member 32 is not necessarily arranged in parallel. Moreover, an optical waveguide path may be used instead of the optical fiber bundle 29. The optical waveguide path comprises, for example, 10 pieces of single channel waveguide path corresponding to a single optical fiber 29a may be arranged in parallel to each other. When using such an optical waveguide path, the half mirror 31 of the optical branch part 30 is provided to the optical path of the optical wavelength path.

The optical connection part 28 is provided above the optical branch part 30. The optical connection part 28 comprises a V-shaped groove member 33 and an optical fiber 28a arranged on the V-shaped groove member 33 and extends in a vertical direction. The bottom surface of the optical connector part 28 contacts the top surface of the optical branch part 30 so that the optical signals from the optical branch part 30 is incident on the end surface of the optical fiber 28a of the optical connection part 28.

The top surface of the optical connection part 28 substantially contacts a light-emitting/receiving surface of the photoelectric conversion circuit 22 mounted on the board 12. The optical connection part 28 transmits optical signals from the optical branch part 30 to the photoelectric conversion circuit 22 and receives optical signals from the photoelectric conversion circuit 22 and transmits the optical signals to the optical branch part 30. Positioning of the board 12 is performed by fitting between the lower edge 12a of the board 12 and the rail 25 and fitting between the connector 23 of the board 12 shown in FIG. 4 and the connector 24 of the center plane 13 shown in FIG. 5.

Returning to FIG. 6 and FIG. 7, the photoelectric conversion circuit 22 mounted on the board 12 comprises an optical-to-electric conversion element 22a, which converts received optical signals into electric signals, and an electric-to optical conversion element 22b, which converts electric signals into optical signals. Data processed by the CPU 19 of the board 12 is converted from electric signals into optical signals by the photoelectric conversion circuit 22, and sent to the optical connection part 28, and, then, sent to other boards 12 through the optical transmission circuit 26. Additionally, data from other boards is converted from optical signals into electric signals by the photoelectric conversion circuit 22, and stored in the memory circuit unit 22 or the hard disk apparatus 21 through the wirings 35 of the board 12 or the converted electric signals are processed by the CPU 19.

For example, a PIN photodiode or an avalanche photodiode can be used for the optical-to-electric conversion element 22a. A light-emitting diode or a semiconductor laser may be used for the electric-to-optical conversion element 22b.

As mentioned above, according to the present embodiment, the boards 12 of the optical transmission circuit device 11 are mutually connected by the optical transmission circuit 26 having a plurality of optical fibers 29a arranged in parallel to each other, and, thus, transmission and reception of data can be achieved by multi-channel parallel transmission, which enables high-speed data transmission.

It should be noted that a known system can be used for the optical transmission method in the optical transmission circuit device according to the present embodiment. As the optical transmission method, there is, for example, an intensity modulation direct detection method of a digital transmission. A circuit performing the optical transmission method may be provided in the photoelectric conversion circuit 22 on the board 12.

Additionally, in the optical transmission circuit device according to the present embodiment, although illustration is omitted, the optical fiber bundle 29 and the optical branch parts 30 shown in FIG. 6 may be mounted on the backside surface 17b of the bottom plate 17. Further, the optical fiber bundle 29 and the optical branch parts 30 may be mounted on both the front surface 17a and the backside surface 17b of the bottom plate 17.

A description will now be given of a variation of the above-mentioned first embodiment of the present invention. The optical transmission circuit device according to the variation of the first embodiment further comprises a plurality of boards provided on the under side of the bottom plate, and the boards are mutually connected by an optical transmission circuit.

Figure 9:
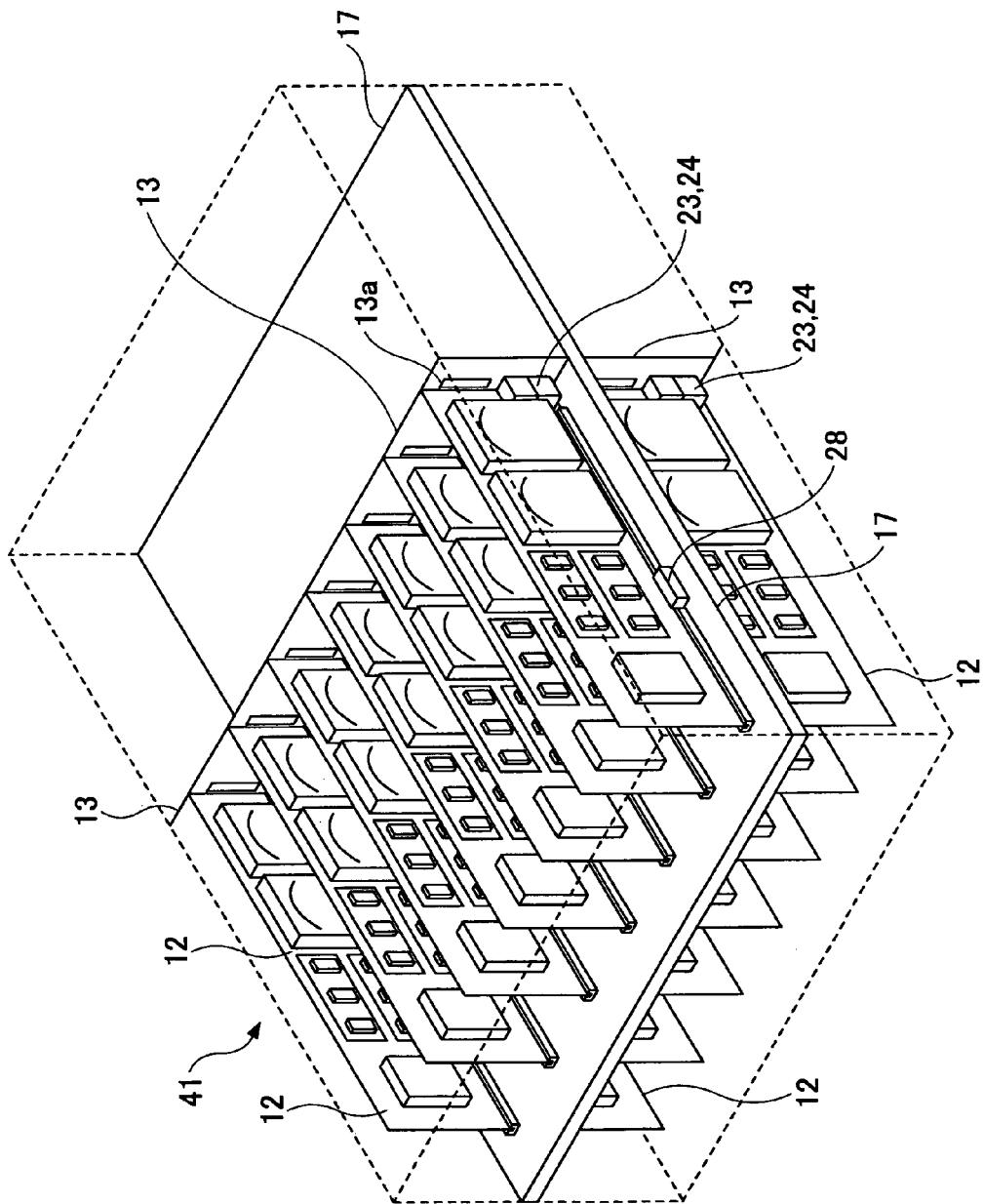
FIG. 9 is a perspective view of an optical transmission circuit device according to a variation of the first embodiment.
Figure 10:
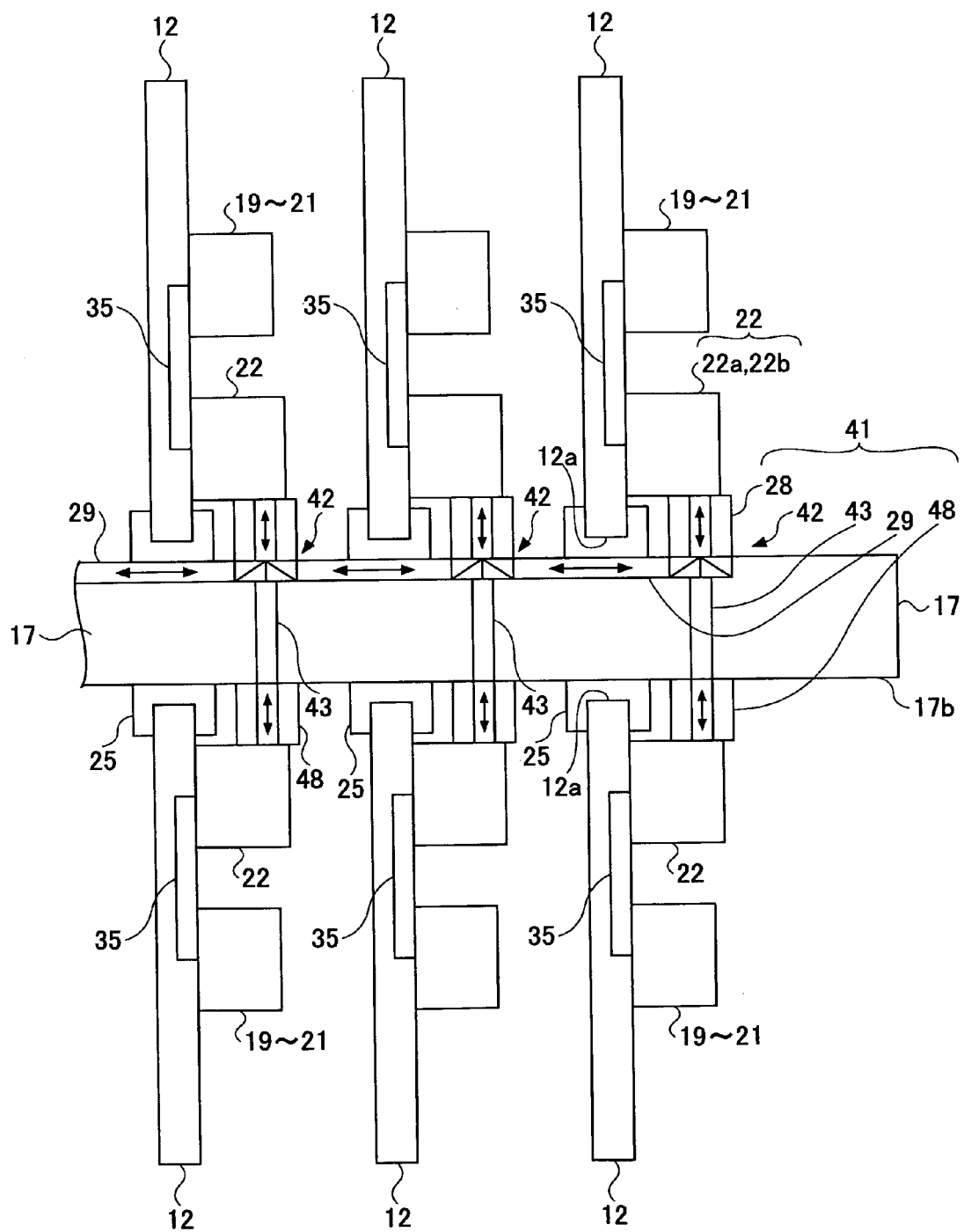
FIG. 10 is an illustrative cross-sectional view of a part of the optical transmission circuit device showing in FIG. 9.

FIG. 9 is a perspective view of the optical transmission circuit device according to a variation of the first embodiment. In FIG. 9, illustration of the side plates and the back plane of the optical transmission circuit device is omitted. FIG. 10 is an illustrative cross-sectional view of a part of the optical transmission circuit device showing in FIG. 9. In FIGS. 9 and 10, parts that are the same as the parts explained before are given the same reference numerals, and descriptions there of will be omitted.

Referring to FIGS. 9 and 10, the rails 25 are provided to the backside surface 17b of the bottom plate 17 so that an upper edge 12b of each of the boards 12 is fitted into the respective rail 25. The connector 23 mounted on each board 12 is fitted and fixed to the corresponding connector 24 of the center plane 13. The optical transmission circuit 41 has the same structure as the optical transmission circuit 41 according to the first embodiment except for the optical branch parts 42, the optical connection parts 48 and the optical fiber bundles 43. The optical branch parts 42 are located under the optical connection parts 28 on the front side of the bottom plate 17, and the optical connection parts 48 are provided on the backside surface 17b of the bottom plate 17. The optical fiber bundles 43 connect the optical branch parts 42 to the respective optical connection parts 48.

Similar to the optical branch parts of the first embodiment, each of the optical branch parts 42 comprises a half mirror or a prism that branches an optical path in both upward and downward directions. An optical waveguide path may be used instead of the optical fiber bundle 29. The optical connection parts 48 provided on the backside surface 17b of the bottom plate 17 have the same structure as the optical connection parts of the first embodiment.

According to the above-mentioned variation, in addition to the effects provided by the optical transmission circuit device according to the first embodiment, the number of boards 12 mountable to the optical transmission circuit device 41 can be increased by providing the boards on the backside surface 17b of the bottom plate 17, which improves expandability of the optical transmission circuit device 41.

It should be noted that the optical connection parts 48 and the rails 25 mounted on the backside surface 17b of the bottom plate 17 may be arranged so that the boards 12 mounted on the front side of the bottom plate 17 and the boards 12 mounted on the backside surface 17b of the bottom plate 17 are made common to each other. Additionally, the optical fiber bundles 29 and the optical branch parts 42 may be provided on the backside surface 17b of the bottom plate 17.

Second Embodiment

A description will now be given of a second embodiment of the present invention. An optical transmission circuit device according to the second embodiment of the present invention has a connection board at a position where a board is located between the optical transmission circuit devices, the connection board being provided to achieve data transmission between the optical transmission circuit devices.

Figure 11:
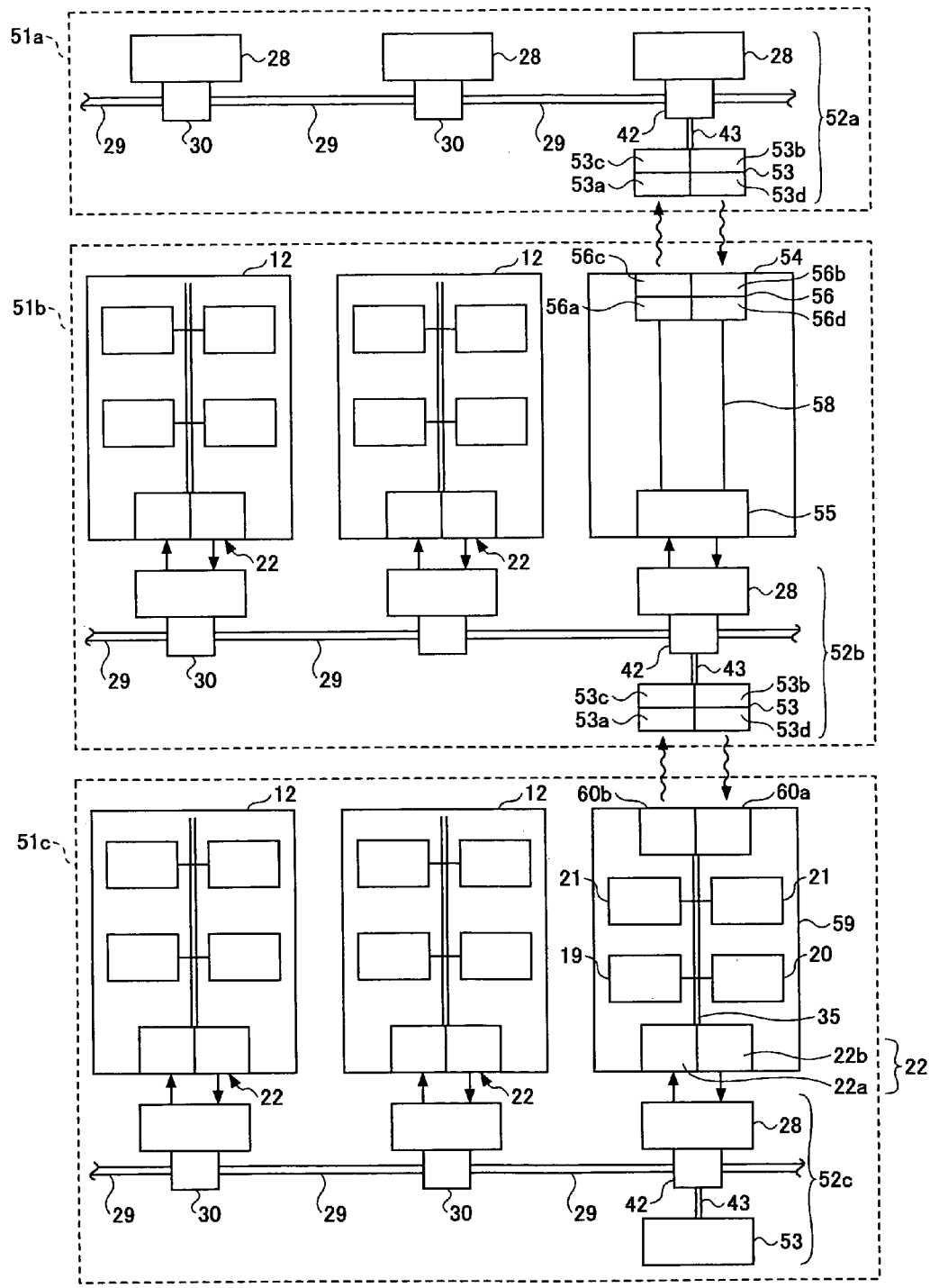
FIG. 11 is a block diagram of an optical transmission circuit device according to a second embodiment of the present invention.
Figure 12A:
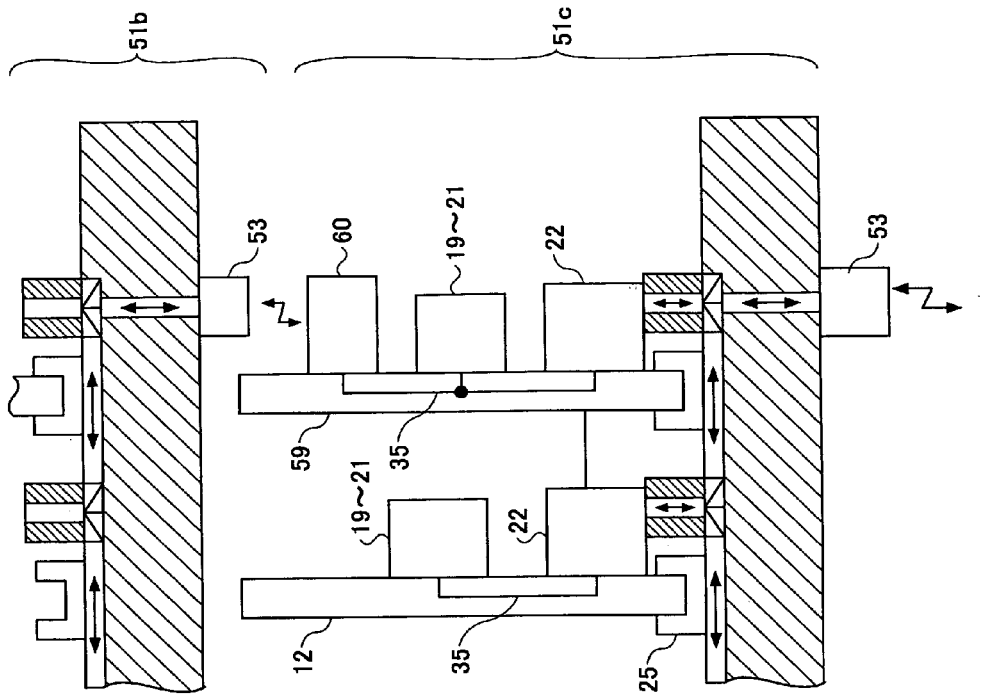
FIGS. 12A and 12B are illustrative cross-sectional views of parts of the optical transmission circuit device according to the second embodiment of the present invention.
Figure 12B:
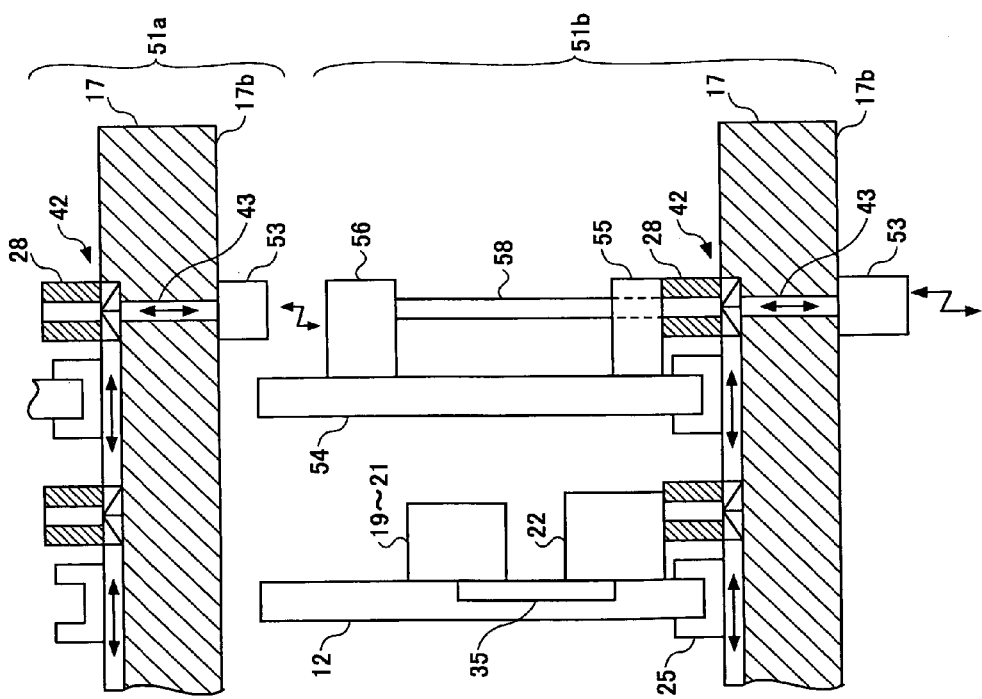

FIG. 11 is a block diagram of the optical transmission circuit device according to the second embodiment of the present invention. FIGS. 12A and 12B are illustrative cross-sectional views of parts of the optical transmission circuit device according to the second embodiment of the present invention. FIGS. 12A and 12B show parts of the structure shown in FIG. 11. In FIGS. 11, 12A and 12B, parts that are the same as the parts explained before are given the same reference numerals, and descriptions thereof will be omitted.

Referring to FIG. 11 and FIG. 12A, an assembly of the optical transmission circuit devices 51a-51c according to the present embodiment is stacked one on another. Each of the optical transmission circuits 52a-52c provided on the bottom plate 17 (not shown in FIG. 11) has an optical branch part 42 instead of the optical branch part of the first embodiment. The optical branch part 42 is capable of branching the optical path also in a downward direction. Each of the optical transmission circuits 52a-52c also has a bottom-side light-emitting/receiving circuit 53 mounted on the backside surface 17b of the bottom plate 17. The optical branch part 42 is connected to the bottom-side light-emitting/receiving circuit 53 by an optical fiber bundle 43.

Provided on the optical transmission circuit device 51b is the connection board 54, which connect the optical transmission circuit device 51b to the optical transmission circuit 52a of the optical transmission circuit 51a. The connection board 54 comprises a board-side optical connection part 55, a board-side light-emitting/receiving circuit 56 and an optical fiber bundle 58 which connects the board-side optical connection part 55 to the board-side light-emitting/receiving circuit 56. The board-side optical connection part 55 is connected to the optical connection part 28 (hereinafter, referred to as circuit-side optical connection part) of the optical transmission circuit 52b. The board-side light-emitting/receiving circuit 56 is connected to the bottom-side light-emitting/receiving circuit 53 of the board-side connection part 55.

The board-side light connection part 55 has substantially the same structure as the circuit-side optical connection part 28. That is, the board-side light connection part 55 comprises optical fiber bundles and V-shaped groove members which positions each of the optical fibers of the optical fiber bundles. The board-side light connection part 55 is configured and arranged to contact the circuit-side optical connection part 28 to transmit optical signals through the optical fibers.

The board-side light-emitting/receiving circuit 56 comprises two sets of optical-to-electric conversion elements 56a and 56b and electric-to-optical conversion elements 56c and 56d. Optical signals received from the optical fiber bundle 58 are converted into electric signals by the optical-to-electric conversion element 56a, and the electric signals are further converted into optical signals by the electric-to-optical conversion element 56c. The thus-produced optical signals are supplied to the bottom-side light-emitting/receiving circuit 53 of the optical transmission circuit device 51 located above. Optical signals supplied from the bottom-side light-emitting/receiving circuit 53 of the optical transmission circuit device 51a are converted by the optical-to-electric conversion element 56b and the electric-to-optical conversion element 56d, and the thus-produced optical signals are transmitted through the optical fiber bundle 58.

The bottom-side light-emitting/receiving circuit 53 has the same structure as the board-side light-emitting/receiving circuit 56. Optical signals received from the optical branch part 42 are converted into electric signals by the optical-to-electric conversion element 53a, and the electric signals are further converted into optical signals by the electric-to-optical conversion element 53c. The thus-produced optical signals are supplied to the board-side light-emitting/receiving circuit 56. Additionally, optical signals received from the board-side light-emitting/receiving circuit 56 are converted into electric signals by the optical-to-electric conversion element 53b, and the electric signals are further converted into optical signals by the electric-to-optical conversion element 53d. The thus-produced optical signals are supplied to the optical branch part 42 of the optical transmission circuit 52a.

According to the above-mentioned structure, the parallel data transmission between the optical transmission circuit devices 51a and 51b, which is difficult to achieve with a narrow space of the center plane and the back plane, can be achieved, thereby achieving high-speed data transmission. Additionally, a positioning tolerance of the optical transmission circuit device when mounting to the cabinet of the electronic apparatus can be increased by achieving the spatial transmission of optical signals between the optical transmission circuit device 51a and the optical transmission circuit device 51b that are located vertically.

Referring now to FIG. 11 and FIG. 12B, the connection board 59 of the optical transmission circuit device 51a comprises the board 12 having CPU, etc., and further comprising a board-side light-emitting/receiving circuit 60.

The board-side light-emitting/receiving circuit 60 comprises optical-to-electric conversion element 60a and an electric-to-optical conversion element 60b, and connected to the photoelectric conversion circuit 22 through the wirings 35 such as a bus, etc. The optical-to-electric conversion element 60a converts optical signals from the bottom-side light-emitting/receiving circuit 53 into electric signals, and sends the electric signals to the electric-to-optical conversion element 22b of the photoelectric conversion circuit 22. The electric signals are converted into optical signals by the electric-to-optical conversion element 22b, and sent to other boards 12. The optical signals in a reverse direction are sent to the bottom-side light-emitting/receiving circuit 53 located above the optical transmission circuit device 51a through the optical-to-electric conversion element 22a of the photoelectric conversion circuit 22, the wirings 35 and the electric-to-optical conversion element 60b of the board-side light-emitting/receiving circuit 60 in that order.

According to the above-mentioned structure, the connection board can provide a board function, which enables the optical transmission between the optical transmission circuit devices without decreasing the number of boards.

According to the present embodiment, since the connection board is provided at a position where the board 12 is mounted to make a connection with the optical transmission circuit of the optical transmission circuit device located above, the parallel transmission can be performed between the optical transmission circuit devices, which are located vertically, without using cable wirings that tends to be complex arrangement.

Third Embodiment

Figure 13:
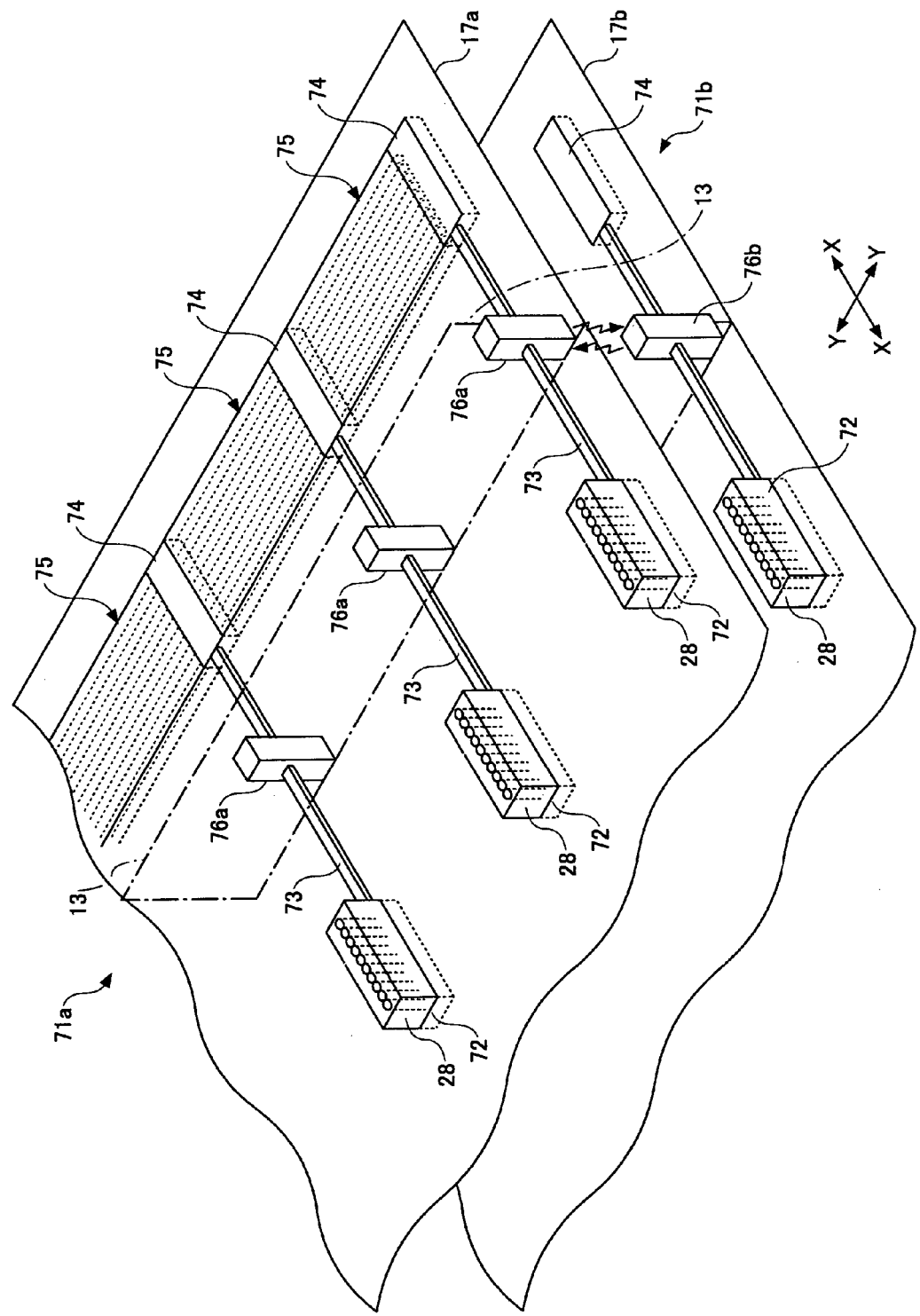
FIG. 13 is a perspective view of an optical transmission circuit of an optical transmission circuit device according to a third embodiment of the present invention.

A description will now be give, with reference to FIG. 13, of a third embodiment of the present invention. An optical transmission circuit device according to the third embodiment of the present invention has optical transmission circuits provided behind an area where boards are mounted and light-emitting/receiving circuits provided to a center plane.

FIG. 13 is a perspective view of the optical transmission circuit constituting the optical transmission circuit device according to the third embodiment of the present invention. The optical transmission circuit device according to the present embodiment has basically the same structure as the optical transmission circuit device shown in FIG. 4 except for the structure of the optical transmission circuits. In FIG. 13, parts that are the same as the parts explained before are given the same reference numerals, and descriptions thereof will be omitted.

Referring to FIG. 13, each of the optical transmission circuit devices 71a and 71b according to the present embodiment comprises: optical connection parts 28 connected to boards provided on base plates 17a or 17b; first optical branch parts 72 changing optical paths of the optical connection parts 28 to a direction toward a rear side of the optical transmission circuit device 71a or 71b; first optical fiber bundles 73 connected to the first optical branch parts and extending from a front side to the rear side (in a direction indicated by an arrow X in the figure); second optical branch parts 74 connected to the first optical fiber bundles 73 and changing the optical paths to a direction of width of the optical transmission circuit devices 17a or 17b (in a direction indicated by an arrow Y in the figure); second optical fiber bundles 75 connecting between the second optical branch parts 74; and light-emitting/receiving circuits 76 provided on the center plane 13 and connected to the first optical fiber bundles 73.

Each of the first optical branch parts 72 comprises a mirror or a prism and connects the optical paths of a corresponding one of the optical connection parts 28 to a corresponding one of the first fiber bundles 73 by changing a direction of the optical paths to the direction X. Additionally, each of the second optical branch parts 74 has basically the same structure as the optical branch part of the above-mentioned first embodiment, and comprises a half mirror or a prism that branches optical paths to a vertical direction.

Each of the first optical fiber bundles 73 and the second optical fiber bundles 75 has basically the same structure as the optical fiber bundle of the above-mentioned first embodiment, which includes a plurality of optical fibers combined in a tape-like shape or a bundle-like shape. The first optical fiber bundles 73 and the second optical fiber bundle 75 are connected to the first optical branch parts 72 or the second optical branch parts 74 in the same manner as that of the above-mentioned first embodiment.

The light-emitting/receiving circuits 76a transmit optical signals transmitting through the first fiber bundles 73 to the light-emitting/receiving circuits 76b of the optical transmission circuit device 71b located under the optical transmission circuit device 71a so as to connect between the optical circuits 72 of the optical transmission circuit device 71a and the optical circuits 72 of the optical transmission circuit device 71b.

Although illustration is omitted, each of the light-emitting/receiving circuits 76a comprises: an optical-to-electric conversion element and an electric-to optical conversion element connected to the first optical fiber bundles; and two light-emitting/receiving circuits performing a spatial optical transmission in a vertical direction, wherein the optical-to-electric conversion element and the electric-to optical conversion element are connected to the respective light-emitting/receiving circuits. A structure of each of the elements and circuits is the same as that of the first and second embodiments. It should be noted that although illustration is omitted, the optical transmission circuit device 71a is capable of communicating with another optical transmission circuit device located above.

According to the present embodiment, a part of the optical transmission circuit, which transmits optical signals from the board, is provided behind an area where the boards are mounted. Thus, a space for providing the second optical fiber bundles 75 and the second optical branch parts 74 can be reserved, which enables a parallel transmission between the optical transmission circuit devices.

It should be noted that a carrier to noise ratio may be improved by avoiding an optical loss by inserting an optical amplifier into the second optical fiber bundle 75. In the present embodiment, since a space for providing the optical transmission circuit is large, such an optical amplifier can be arranged easily. Moreover, optical waveguide paths may be used instead of the first and second optical fiber bundles 73 and 75.

Although the preferred embodiments of the present invention were explained above, the present invention is not limited to the specifically disclosed embodiments, and variations and modification may be made without departing from the scope of the present invention. For example, any of the first embodiment and variations thereof, the second embodiment and the third embodiment may be combined with each other.

The present application is based on Japanese priority application No. 2004-248906 filed Aug. 27, 2004, the entire contents of which are hereby incorporated herein by reference.

What is claimed is:

1. An optical transmission circuit device comprising:
a base plate;
a plurality of boards arranged perpendicular to the base plate and parallel to each other; and
an optical transmission circuit optically connecting the boards, wherein
each of said boards has a photoelectric conversion circuit that converts optical signals into electric signals and vice versa;
said optical transmission circuit includes a plurality of optical transmission paths parallel to each other and extending in a direction of arrangement of said boards on said base plate, and an optical connection part mounted on said base plate for each of said boards and connected to the optical transmission paths;
said photoelectric conversion circuit is connected to said optical connection part so that data transmission between said boards is performed through said optical transmission circuit;
said base plate is arranged substantially horizontally and said boards are arranged substantially vertically;
other optical transmission circuit devices are located above and under said optical transmission circuit device;
each of said boards has a first light-emitting/receiving circuit connected to a respective one of said photoelectric conversion circuits;
said optical transmission circuit further includes an optical branch part that chances a direction of transmission of optical signals transmitting through said optical transmission paths to a direction substantially perpendicular to said base plate, a second light-emitting/receiving circuit provided on a bottom surface of said base plate and a plurality of vertical optical transmission paths connecting the second light-emitting/receiving circuit to said optical branch part;
said first light-emitting/receiving circuit includes a first electric-to-optical conversion element and a first optical-to-electric conversion element, the first electric-to-optical conversion element sending optical signals to a light-emitting/receiving circuit of another optical transmission circuit device positioned above said optical transmission circuit device, the first electric-to-optical conversion element receiving optical signals from the light-emitting/receiving circuit of said another optical transmission circuit device; and
said second light-emitting/receiving circuit includes a second electric-to-optical conversion element and a second optical-to-electric conversion element, the second electric-to-optical conversion element sending optical signals to a light-emitting/receiving circuit of another optical transmission circuit device positioned under said optical transmission circuit device, the second optical-to-electric conversion element receiving optical signals from the light-emitting/receiving circuit of said another optical transmission circuit device.

2. The optical transmission circuit device as claimed in claim 1, wherein each of said optical transmission paths comprises one of an optical fiber and an optical waveguide path.

3. The optical transmission circuit device as claimed in claim 1, further comprising a plate arranged perpendicular to said base plate and said boards, wherein edges of said boards are fitted to rails provided on said base plate, and connection members provided to said boards are engaged with connection members provided to said plate so that said boards are fixed to said base plate and each of said photoelectric conversion circuits is aligned with a corresponding one of said optical connection parts.

4. The optical transmission circuit device as claimed in claim 3, wherein each of said optical transmission paths comprises one of an optical fiber and an optical waveguide path.

5. The optical transmission circuit device as claimed in claim 1, wherein each of said optical connection parts includes a plurality of optical fibers or a plurality of optical waveguide paths that are arranged regularly, and each of said optical connection parts is connected to a respective one of said photoelectric conversion circuits by being brought into contact with said one of said photoelectric conversion circuits.

6. The optical transmission circuit device as claimed in claim 1, wherein each of said photoelectric conversion circuits includes an optical-to-electric conversion element that converts optical signals into electric signals and an electric-to-optical conversion element that converts electric signals into optical signals.

7. The optical transmission circuit device as claimed in claim 1, wherein said first electric-to-optical conversion element and said first optical-to-electric conversion element are connected to said first light-emitting/receiving circuit in each of said boards.

8. The optical transmission circuit device as claimed in claim 1, wherein each of said boards includes another optical connection part being brought into contact with and connected to said optical connection part and a plurality of other optical transmission paths connecting the another optical connection part and said first light-emitting/receiving circuit; and said first light-emitting/receiving circuit includes another first optical-to-electric conversion element and another fist electric-to-optical conversion element, said another first optical-to electric conversion element being connected to said first electric-to-optical conversion element and converting optical signals transmitting through said another optical transmission paths into electric signals, said another first electric-to-optical conversion element converting electric signals supplied from said first optical-to-electric conversion element into optical signals transmitted through said another optical transmission paths.

9. A cabinet of an electronic apparatus comprising:
a housing; and
a plurality of optical transmission circuit devices accommodated and arranged vertically in said housing, wherein
at least one of said optical transmission circuit devices comprises:
a base plate;
a plurality of boards arranged perpendicular to the base plate and parallel to each other; and
an optical transmission circuit optically connecting the boards;
each of said boards has a photoelectric conversion circuit that converts optical signals into electric signals and vice versa;
said optical transmission circuit includes a plurality of optical transmission paths parallel to each other and extending in a direction of arrangement of said boards on said base plate, and an optical connection part mounted on said base plate for each of said boards and connected to the optical transmission paths;

said photoelectric conversion circuit is connected to said optical connection part so that data transmission between said boards is performed through said optical transmission circuit;

said base plate is arranged substantially horizontally and said boards are arranged substantially vertically;

other optical transmission circuit devices are located above and under said optical transmission circuit device;

each of said boards has a first light-emitting/receiving circuit connected to a respective one of said photoelectric conversion circuits;

said optical transmission circuit further includes an optical branch part that changes a direction of transmission of optical signals transmitting through said optical transmission paths to a direction substantially perpendicular to said base plate, a second light-emitting/receiving circuit provided on a bottom surface of said base plate and a plurality of vertical optical transmission paths connecting the second light-emitting/receiving circuit to said optical branch part;

said first light-emitting/receiving circuit includes a first electric-to-optical conversion element and a first optical-to-electric conversion element, the first electric-to-optical conversion element sending optical signals to a light-emitting/receiving circuit of another optical transmission circuit device positioned above said optical transmission circuit device, the first electric-to-optical conversion element receiving optical signals from the light-emitting/receiving circuit of said another optical transmission circuit device; and said second light-emitting/receiving circuit includes a second electric-to-optical conversion element and a second optical-to-electric conversion element, the second electric-to-optical conversion element sending optical signals to a light-emitting/receiving circuit of another optical transmission circuit device positioned under said optical transmission circuit device, the second optical-to-electric conversion element receiving optical signals from the light-emitting/receiving circuit of said another optical transmission circuit device.

* * * * *

UNITED STATES PATENT AND TRADEMARK OFFICE
CERTIFICATE OF CORRECTION

PATENT NO.         : 7,275,876 B2                                      Page 1 of 1
APPLICATION NO. : 10/994292
DATED              : October 2, 2007
INVENTOR(S)        : Yoshihiro Morita It is certified that error appears in the above-identified patent and that said Letters Patent is hereby corrected as shown below:

Column 13, Line 31, change "chances" to --changes--.

Column 14, Line 39, change "fist" to --first--.

Signed and Sealed this

Thirteenth Day of May, 2008

JON W. DUDAS
*Director of the United States Patent and Trademark Office*